No. 794,428. PATENTED JULY 11, 1905.
E. J. SIMON.
TRUCK.
APPLICATION FILED DEC. 30, 1904.

Witnesses:
O. L. Goodrich
G. H. Stickney

Inventor:
Ernest J. Simon
by Jno. M. Gleason.
Attorney

No. 794,428. Patented July 11, 1905.

UNITED STATES PATENT OFFICE.

ERNEST J. SIMON, OF PORT HURON, MICHIGAN.

TRUCK.

SPECIFICATION forming part of Letters Patent No. 794,428, dated July 11, 1905.

Application filed December 30, 1904. Serial No. 239,053.

*To all whom it may concern:*

Be it known that I, ERNEST J. SIMON, a citizen of the United States of America, and a resident of the city of Port Huron, county of St. Clair, and State of Michigan, have invented certain new and useful Improvements in Trucks, of which the following is a full, clear, and exact specification.

This invention relates to trucks for moving heavy articles, such as stoves or the like, and especially to means whereby the operator may easily and quickly load and unload the truck with a minimum of effort.

The invention consists in the matters hereinafter set forth, and more particularly pointed out in the appended claims.

Figure 1:
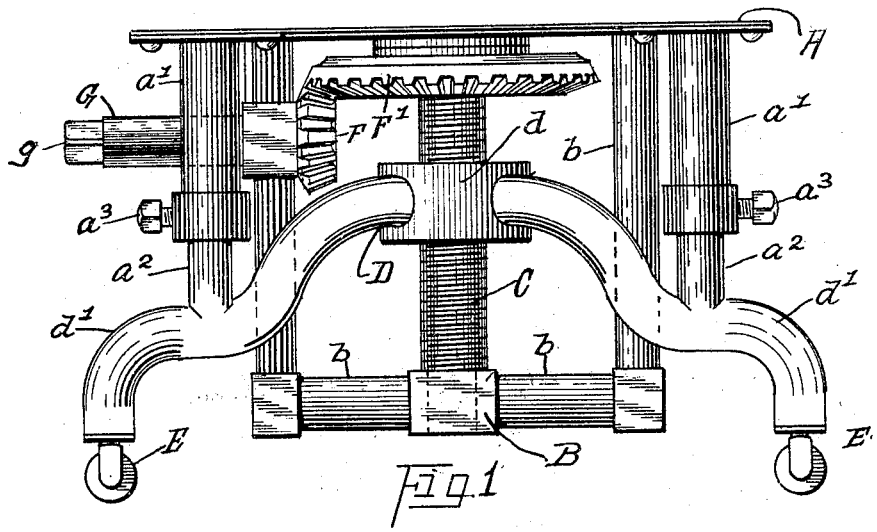
Figure 2:
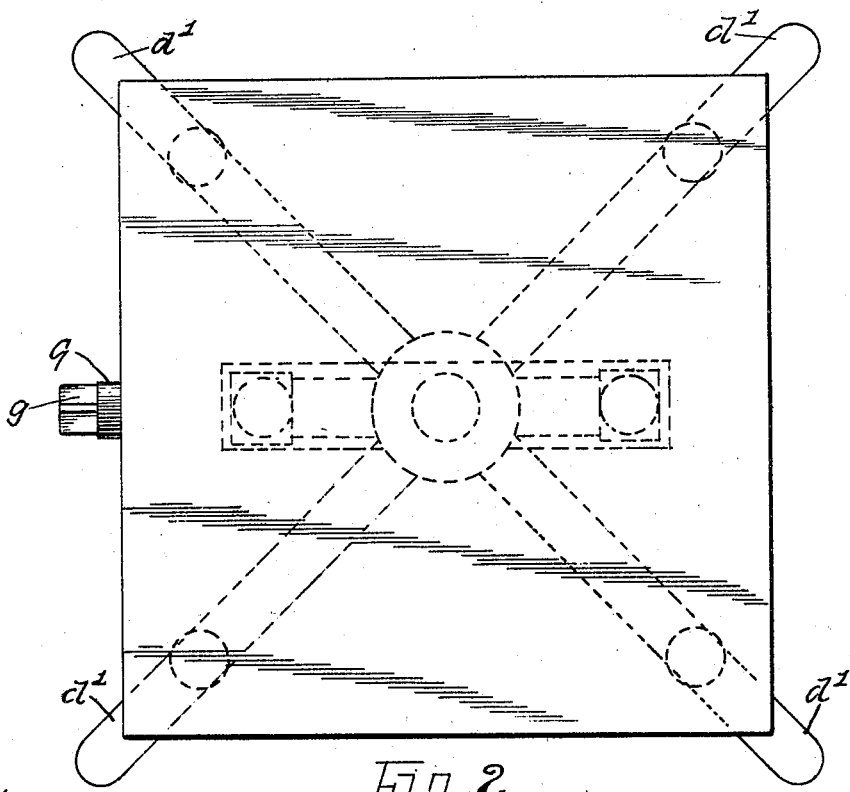

In the drawings, Figure 1 is a view in side elevation of a truck which embodies the principal features of the invention. Fig. 2 is a plan view of the truck.

Referring to the drawings, A represents the platform of the truck, which comprises a horizontal sheet-metal plate of rectangular shape, as herein illustrated, although it may be of any preferred form to adapt it for special purposes. A centrally-disposed vertical yoke B is secured in any suitable manner to the under side of said platform A. As herein shown, said yoke comprises tubular members $b$, suitably coupled. Obviously it may be cast or forged of a single piece of proper material. A screw-threaded stem C is vertically journaled between the yoke and platform in practical alinement with the major vertical axis of the platform. Said platform A is carried by a base or supporting-spider D. Said spider comprises a central apertured boss $d$, interiorly threaded to engage the stem C and supported by a plurality of radially-disposed tubular legs $d'$, whose downturned outer ends are provided with casters E of any suitable form. In order to distribute the load evenly on the spider and aid the stem in maintaining the platform in its horizontal position, the latter is provided with a set of depending tubular standards $a'$ near its margin and over the legs $d'$. Said standards telescope with vertical arms $a^2$ on the legs and may be clamped thereto by set-screws $a^3$.

The stem C is rotated and the platform A thereby raised or lowered by means of meshing bevel-gears F and F', one of which is properly secured to the upper end of the stem and the other to the inner end of a horizontal shaft G, journaled in a bearing in an arm of the stem-yoke B. The outer end $g$ of said shaft G is adapted to receive a crank or wrench and projects beyond the edge of the platform A to give the proper clearance.

The operation of the device is obvious. It is run under the stove or like article and the platform raised until the load is transferred to the truck. The set-screws are then set up and the truck wheeled to the unloading-floor, where the standards are unclamped and the platform lowered clear of the load. By the proper adjustment of the relative pitches of the gears and stem-screw the operator may handle very heavy loads unaided, while the vertical telescoping standards aid in maintaining the platform in its horizontal position while assuming the load and when clamped distribute the weight of the spider evenly, thereby aiding in balancing the load.

Obviously many details of construction may be varied without departing from the spirit of the invention, and I do not limit myself to any particular form or arrangement of parts except as set forth in certain of the appended claims.

I claim as my invention—

1. A truck comprising a horizontal load-platform, a spider supporting the platform, a vertical stem rotatively secured to the platform, having screw-threaded engagement with the spider, means for rotating the stem, and telescoping standards connecting the outer portions of the spider and platform.

2. A truck comprising a horizontal platform, a spider, a vertical stem rotatively secured on a yoke beneath the platform, having screw-threaded engagement with the spider, a horizontal shaft rotatively secured in the yoke, operatively connected to the stem, and vertical, telescoping guides or standards connecting the marginal portions of the platform with the arms of the spider.

3. A truck comprising a horizontal platform, a spider comprising a central boss supported by radially-disposed legs, a stem rotatively secured beneath the platform having screw-threaded engagement with the boss, a horizontal shaft rotatively secured to the platform, gears operatively connecting the stem and shaft, and telescoping vertical standards connecting the legs and platform.

4. A truck comprising a horizontal platform, a yoke secured to the under side thereof, a stem rotatively secured in said yoke in alinement with the vertical axis of the platform, a shaft horizontally journaled in the yoke, gears operatively connecting the stem and shaft, a spider comprising a central boss having screw-threaded engagement with the stem and radial tubular legs provided near their outer ends with perpendicular arms, standards on the platform having longitudinal, sliding engagement with said arms, and clamping-screws in said standards.

In testimony whereof I have hereunto signed my name in the presence of the two subscribing witnesses.

ERNEST J. SIMON.

Witnesses:
JOSEPH A. CARRIGAN,
EDWARD W. WOLFSTYN.